Aug. 12, 1958 S. F. KAMBIC 2,846,981
SELF-SHUT-OFF AIR BLEED CONTROL VALVE AND PNEUMATIC
ACTUATING SYSTEM EMPLOYING SAME
Filed Feb. 25, 1957 6 Sheets-Sheet 2
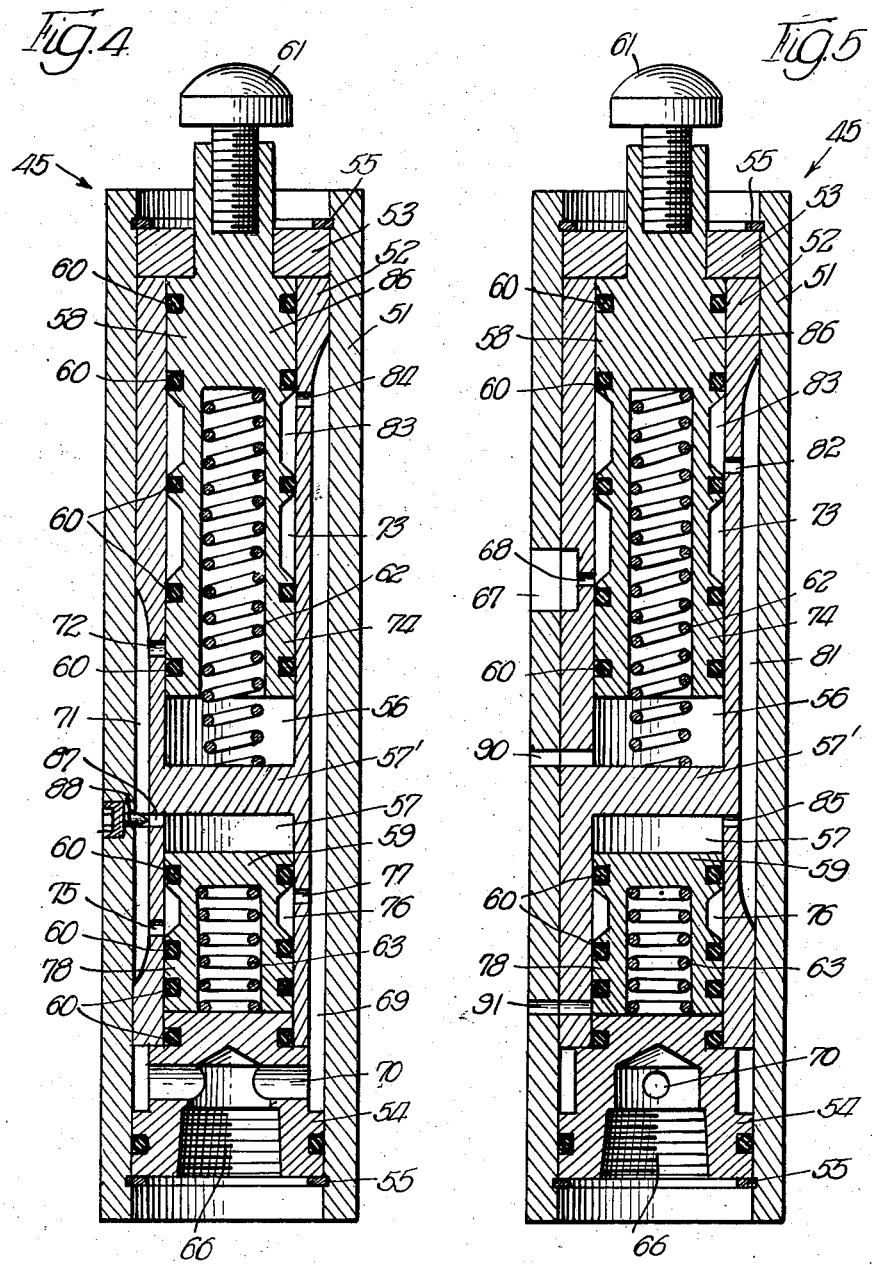
INVENTOR.
Stanley F. Kambic,
BY

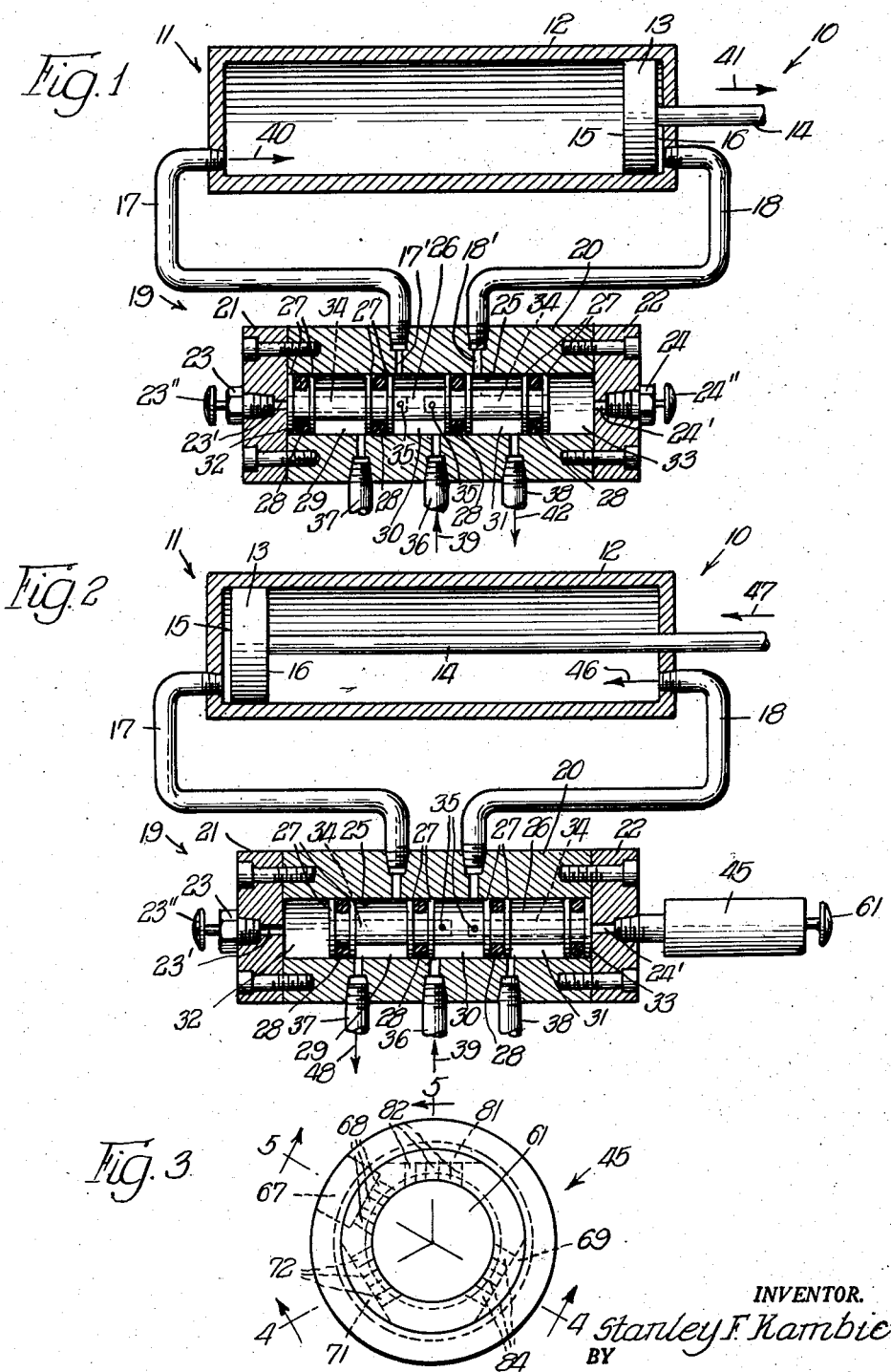

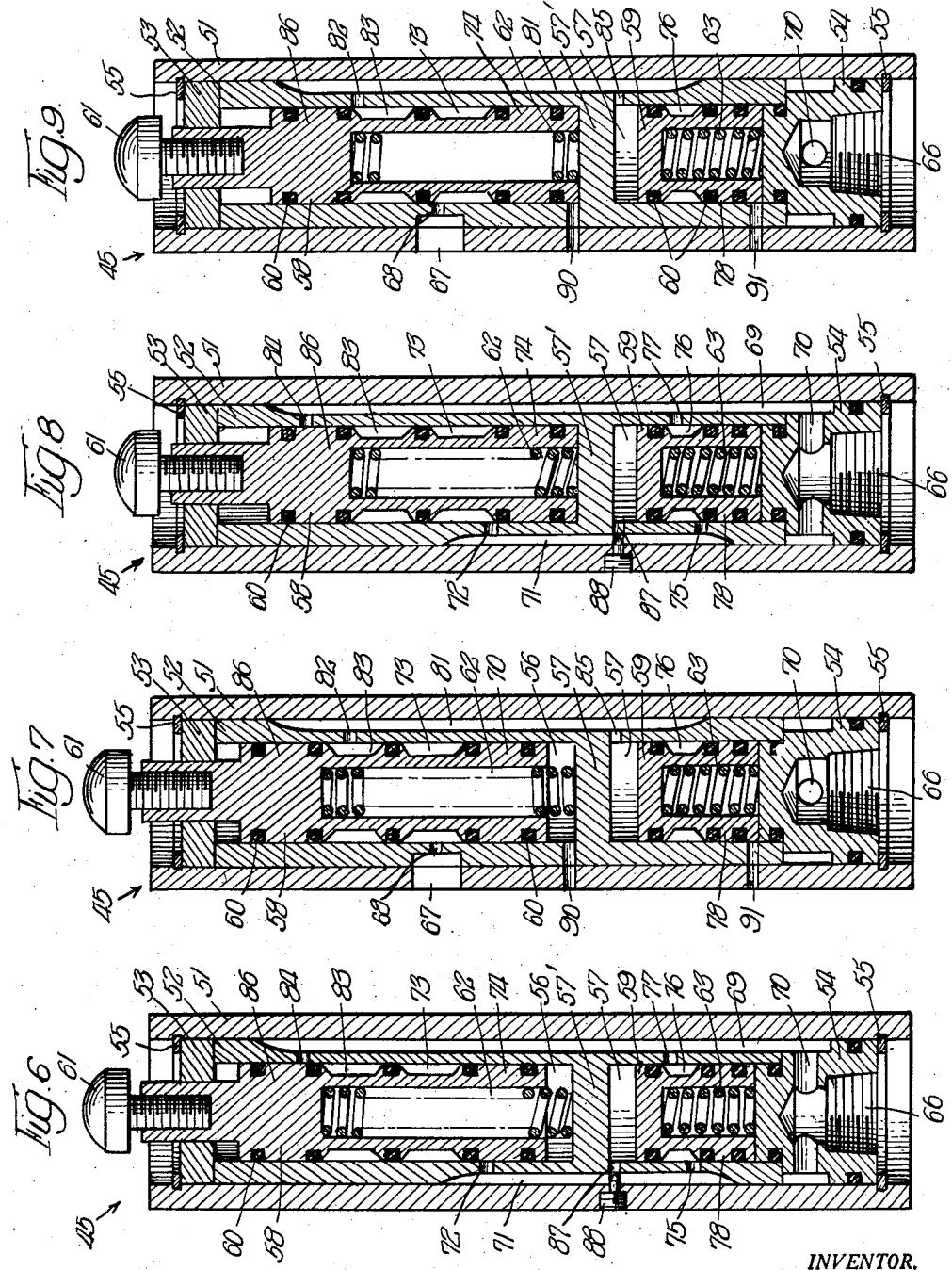

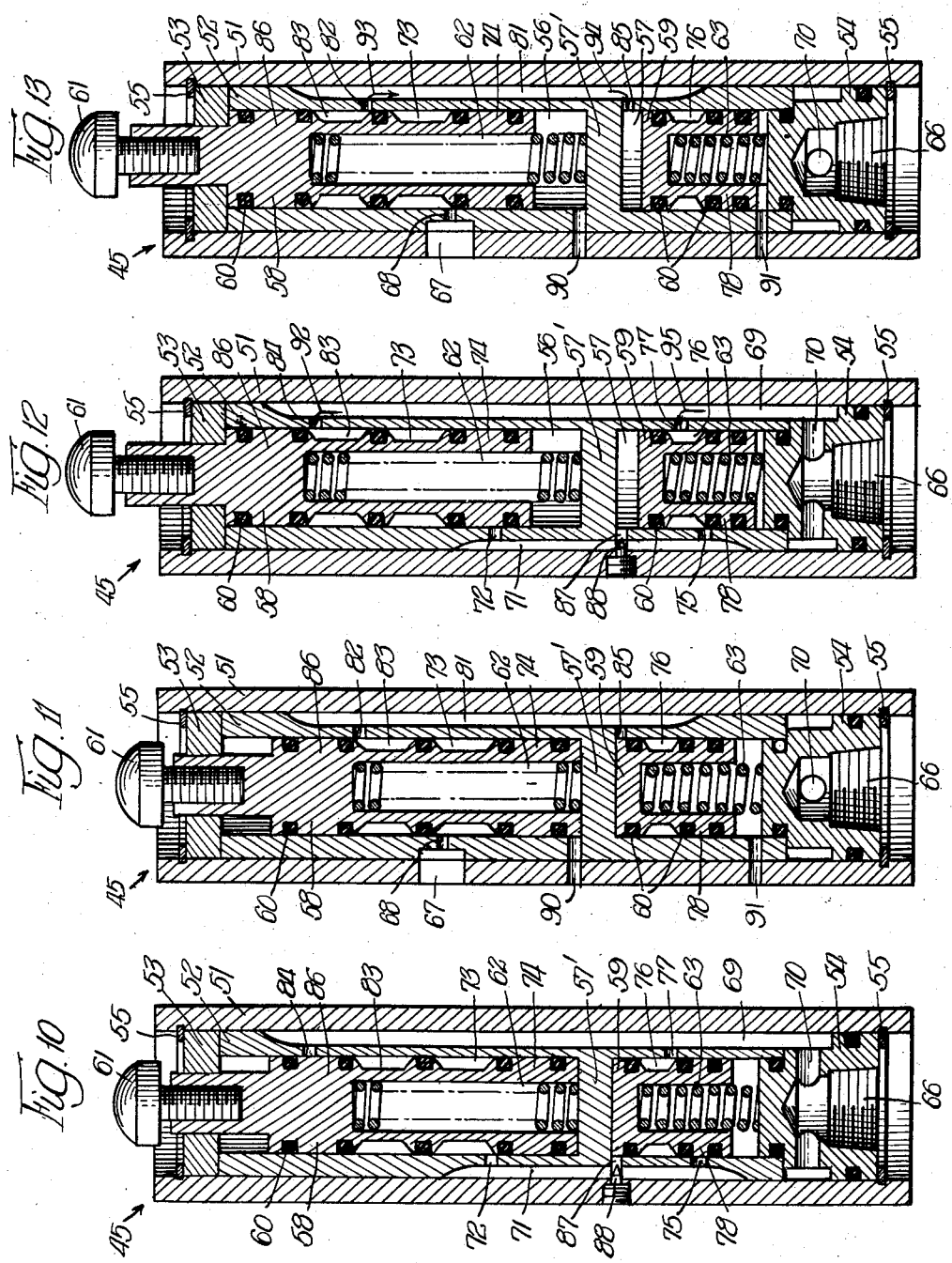

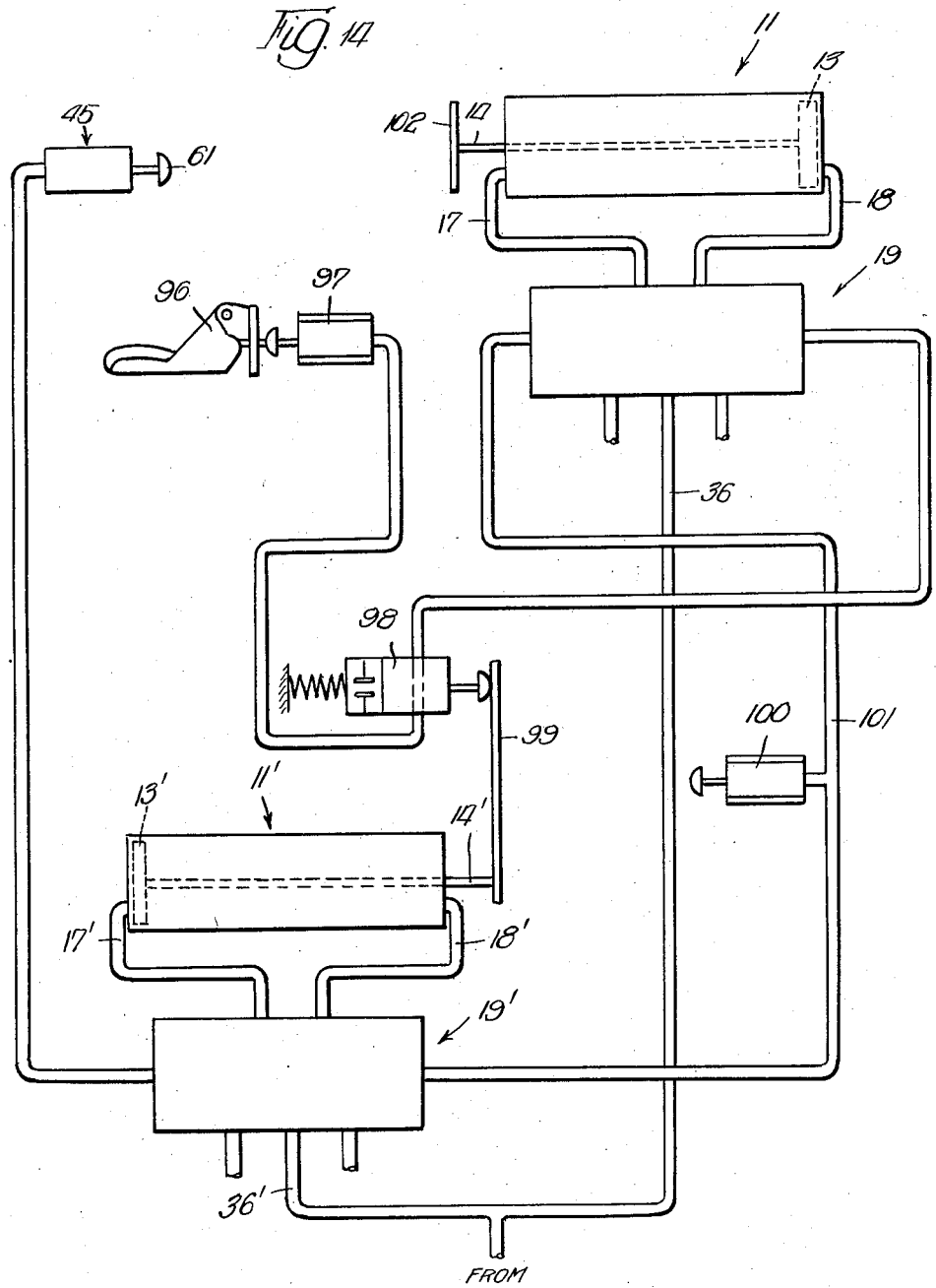

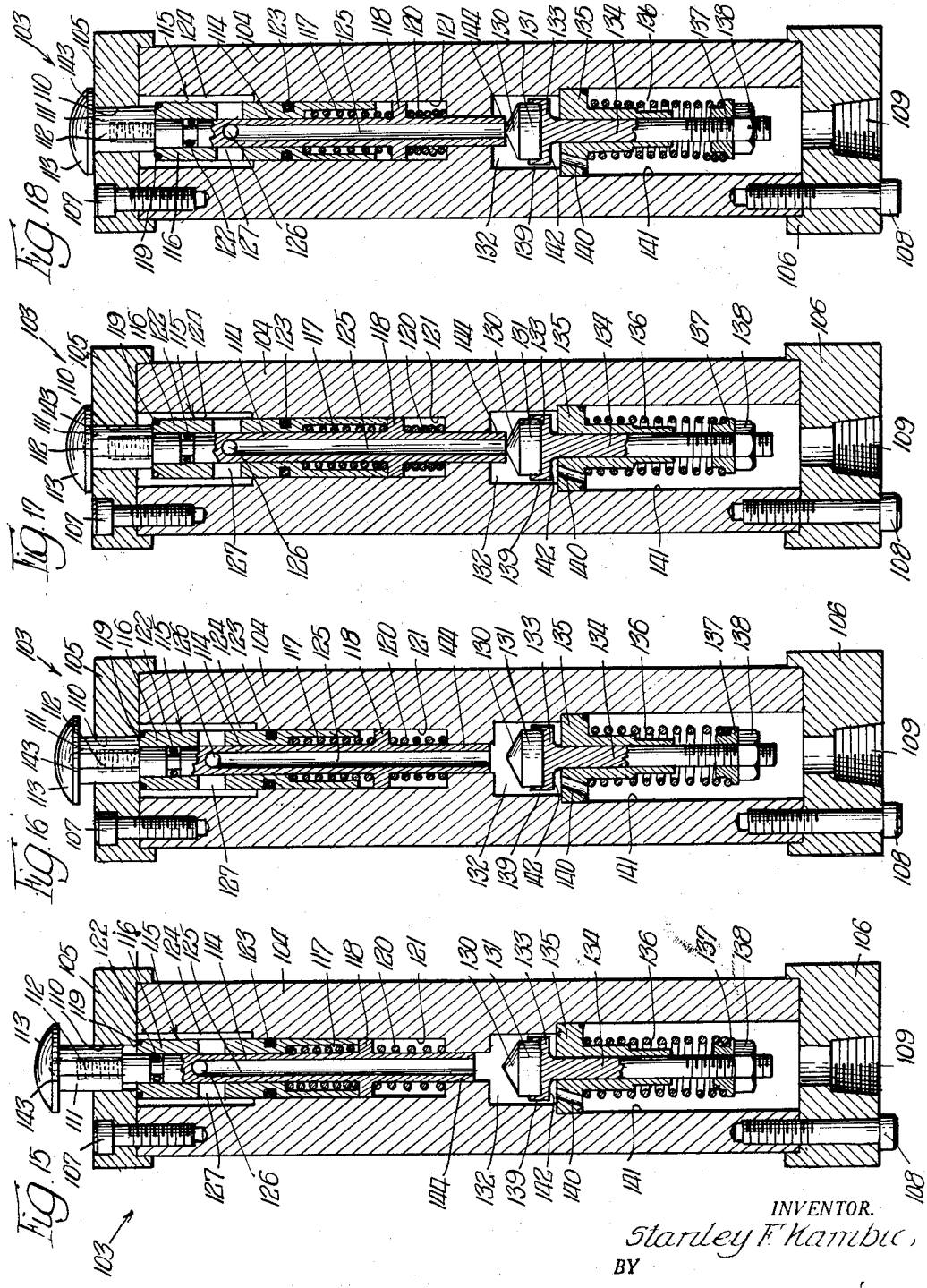

United States Patent Office 2,846,981
Patented Aug. 12, 1958

2,846,981

SELF-SHUT-OFF AIR BLEED CONTROL VALVE AND PNEUMATIC ACTUATING SYSTEM EMPLOYING SAME

Stanley F. Kambic, La Grange, Ill., assignor to Tee-Pak, Inc., Chicago, Ill., a corporation of Illinois Application February 25, 1957, Serial No. 642,245

15 Claims. (Cl. 121—38)

This invention relates, generally, to fluid operated systems and it has particular relation to the construction of sequence valve means therefor.

It is conventional to employ an internal bleed pilot operated valve for controlling the operation of a fluid motor from one position to another by application of fluid pressure, such as air pressure. Such a valve in one position provides for the exhaustion of air pressure from one side of the work member or piston of the motor and for application of air pressure to the other side for effecting its operation to the alternate position. The valve itself is operated by bleeding the air from one end or the other depending upon the direction of next operation. In order to reverse the direction of operation of this valve, it is necessary to discontinue the bleed which permitted the previous operation.

In a fluid pressure operated system where various fluid motors are operated in predetermined sequence, provision is made to discontinue the bleed in order to permit the next operation. When the bleed is initiated as a result of movement of a member to a given position, ordinarily the bleed valve remains in that position until the member moves away from this assumed position. Often it is desirable to discontinue the bleed or to close the bleed valve while the member remains in the position of valve operation. It is to the provision of a solution to this problem that this invention is particularly addressed.

Among the objects of this invention are: To provide for bleeding a line or one end of an internal bleed pilot operated valve on operation of a control member to a given position and to discontinue the bleed while the control member remains in this given position; to automatically discontinue the bleed when the pressure applied to a portion of the mechanism is reduced a predetermined extent; and to reset the valve used to bleed a line even though the valve remains actuated.

Other objects of this invention will, in part, be obvious and in part appear hereinafter.

This invention is disclosed in the embodiments thereof shown in the accompanying drawings and it comprises the features of construction, combination of elements and arrangements of parts that will be exemplified in the constructions hereinafter set forth.

For a more complete understanding of the nature and scope of this invention, reference can be had to the following detailed description, taken together with the accompanying drawings, in which:

Figure 1 is a sectional view of a typical fluid operated system with which the present invention is concerned;

Figure 2 is a view, similar to Figure 1, showing the system modified by the application of the reset or sequence bleed valve of the present invention;

Figure 3 is an end view of the reset or sequence bleed valve, the view being taken from the end where the push button is located;

Figure 4 is a longitudinal sectional view taken generally along the line 4—4 of Figure 3 and showing the internal details of construction of the reset or sequence bleed valve;

Figure 5 is a view, similar to Figure 4, taken generally along the line 5—5 of Figure 3;

Figures 6–7, 8–9, 10–11, and 12–13 are views, similar, respectively, to Figures 4 and 5 and showing various phases of the operation of the reset or sequence bleed valve, depending upon the extent of operation by external means and the subsequent cycle of operations involved in bleeding the internal bleed pilot operated valve;

Figure 14 illustrates, diagrammatically, a fluid operated system in which the reset or sequence bleed valve of the present invention is employed in a typical arrangement;

Figure 15 is a vertical sectional view of a modification of the reset or sequence bleed valve; and Figures 16, 17 and 18 are views, similar to Figure 15, and showing different phases of the operation of the reset or sequence bleed valve.

Referring now particularly to Figure 1 of the drawings, it will be observed that the reference character 10 designates, generally, a fluid operated system. It will be understood that the system can be operated by compressed gas such as air or by liquid, such as oil under pressure. The system includes a fluid motor that is indicated, generally, at 11. While a motor of the translatory type is illustrated, it will be understood that a motor of the rotary type can be employed. The fluid motor 11 includes a cylinder 12 providing a work chamber in which a work member or piston 13 is slidably mounted. The movement of the piston 13 is transmitted externally of the cylinder 12 by a connecting rod 14. It will be understood that fluid pressure is applied to one face 15 or the other face 16 of the work member or piston 13 for operating it in one position or the other.

The opposite ends of the cylinder or work chamber 12 are connected by conduits 17 and 18 to work ports 17′ and 18′ of an internal bleed pilot operated valve that is indicated, generally, at 19. The valve 19 includes a valve cylinder 20 provided with caps 21 and 22 at the ends. As illustrated, the caps 21 and 22 are provided with button bleed valves 23 and 24 which are associated with control ports 23′ and 24′, respectively, at the ends of a bore 25 in the valve cylinder 20. Slidably mounted within the bore 25 is a valve spool 26 which is provided with four sets of radially extending flanges 27 between which O rings 28 are located for sealing purposes. The sets of flanges 27 provide three annular control passageways 29, 30 and 31. Communicating immediately with the control ports 23′ and 24′ are end chambers 32 and 33, respectively, from which the pressure is bled to effect movement of the spool 26 from one end of the bore 25 to the other in a manner to be described hereinafter. This bleed is effected through central bleed passageways 34 extending axially inwardly from the ends of the spool 26. Transverse passageways 35 at the inner ends of the bleed passageways 34 place them in communication with the control passageway 30. The valve cylinder 20 is provided with an intake port to which an inlet conduit 36 is connected and it will be understood that it is supplied from a suitable source of fluid pressure, such as compressed air in this instance. The valve cylinder 20 also is provided with exhaust ports to which exhaust conduits 37 and 38 are connected for exhausting the respective control passageway 29 or 31 to the atmosphere or to a region of lower pressure than that of the conduit 36.

In order to operate the system 10, shown in Figure 1, air under pressure is applied as indicated by the arrow 39 through the inlet conduit 36 to the control passageway 30. Thence the air under pressure flows through the conduit 17 and into the cylinder 12 as indicated by the arrow 40. The air pressure is applied to the face 15 of the work member or piston 13 and it and the connecting rod 14 move in the direction indicated by the arrow 41 to perform the desired function. The air on the opposite side of the work member or piston 13 is exhausted through the conduit 18 to the control passageway 31 and thence out of the exhaust conduit 38 as indicated by the arrow 42.

The system 10 as shown in Figure 1 of the drawings is in the condition to which it is operated by operation of the button bleed valve 23 to bleed the end chamber 32 and permit the air pressure in the air chamber 33 to operate the spool 26 to the position shown. The button bleed valves 23 and 24 are of conventional, normally closed, single passage construction. Each includes a valve plunger spring biased to closed position and operable to open position by depressing the respective button head 23" and 24". It will be understood that the button bleed valve 23, by depression of its button head 23", places the end chamber 32 in direct communication with the atmosphere so that atmospheric pressure exists in this end chamber while air continues to bleed into it from the control passageway 30 through the respective transverse passageway 35 and central bleed passageway 34. As long as the button head 23" of the button bleed valve 23 remains depressed or in the operated position, the system 10 remains in the condition illustrated in Figure 1. In order to move the work member or piston 13 to the opposite end of the cylinder 12, it is necessary to move the spool 26 to the opposite end of the valve cylinder 20. This can be accomplished by depressing the button head 24" or opening the button bleed valve 24 provided, however, that the button bleed valve 23 is closed. It will be understood, as long as the button bleed valve 23 remains operated or open, that the spool 26 cannot be operated to the opposite end of the valve cylinder 20 even though the button bleed valve 24 is depressed or opened.

As soon as the button bleed valve 23 is closed, pressure begins to build up in the end chamber 32. Now, when the button bleed valve 24 is depressed or opened, the end chamber 33 is exhausted to the atmosphere and the pressure in the end chamber 32 then moves the spool 26 to the other end of the valve cylinder 20 where the conduit 18 is placed in communication through the control passageway 30 with the inlet conduit 36 while the conduit 17 is placed in communication through the control passageway 29 with the exhaust conduit 37. The work member or piston 13 then is operated to the opposite end of the cylinder or work chamber 12.

When the system, as illustrated diagrammatically in Figure 1, is incorporated in a larger system employing several fluid motors 11, or other operating devices, it often becomes necessary to effect the reverse movement of the spool 26 of the valve 19 even though the device which effected the operation of one or the other of the button bleed valves 23 or 24 remains in the position in which such valve was opened. While it is possible to provide various complicated mechanical devices for effecting the closure of a bleed valve after it has been actuated by the device effecting the spool reversal, it is preferable to provide in the bleed valve itself means for automatically closing it or resetting it even though a portion of it remains in the operated position.

The system illustrated in Figure 2 of the drawings is similar to the system shown in Figure 1 with the exception that, in lieu of the button bleed valve 24, a reset or sequence bleed valve 45 is employed. The valve 45 will be described in detail hereinafter. For the present it is pointed out that the work member or piston 13 can be operated to the left hand end of the cylinder or work chamber 12 by depressing push button 61, described hereinafter, or opening the reset or sequence bleed valve 45 and then, without releasing push button 61 of the reset or sequence bleed valve 45, the button bleed valve 23 can be operated to effect the movement of the work member or piston 13 to the right hand end of the cylinder or work chamber 12. Of course, it will be understood that eventually the reset sequence bleed valve 45 must be released in order to permit the cycle to be repeated.

It will be understood with reference to Figure 2 of the drawings that the depression of push button 61 or opening of the reset or sequence bleed valve 45 effects the movement of the spool 26 to the position shown with the result that air under pressure flows in the direction indicated by the arrow 46 against the face 16 of the work member or piston 13 to move it and the connecting rod 14 in the direction indicated by the arrow 47. The air on the opposite side of the work member or piston 13 is exhausted through the exhaust conduit 37 as indicated by the arrow 48.

Details of construction of the reset or sequence bleed valve 45 are shown in Figures 4 and 5 of the drawings to which reference now will be had. The showings in Figures 4 and 5 should be considered together and it should be kept in mind that they are sections along the lines 4—4 and 5—5 of Figure 3, as previously pointed out.

The reset or sequence bleed valve 45 is provided with a valve body comprising a cylindrical housing 51 within which there is a cylindrical liner 52. Plugs 53 and 54 are provided at the ends and are held in place by suitable snap rings 55. The liner 52 is provided with valve chambers 56 and 57 opening in opposite directions and axially aligned with a septum 57' therebetween. Slidably mounted within the valve chambers 56 and 57 are first and second valve members or spools 58 and 59, respectively. It will be understood that the first valve member or spool 58 is shown in the closed or unoperated position while the second valve member or spool 59 is illustrated in the open or operated position where it is held by fluid pressure in a manner to be described hereinafter. Any suitable means can be provided for sealing various portions of the valve members 58 and 59 in the respective chambers 56 and 57. For example, O rings 60 can be employed as shown. The first valve member or spool 58 is arranged to be operated externally and for this purpose a push button 61 is provided. However, it will be understood that other external operating means can be provided as may be desired. A coil compression spring 62 reacts between one side of the septum 57' and the first valve member or spool 58 to hold it in the closed position. A coil compression spring 63 reacts between a portion of the end plug 54 and the second valve member or spool 59 to bias it to the closed position, it being understood, as pointed out above, that it is held in open position against the biasing force of this spring by the air pressure applied in the valve chamber 57 between the septum 57' and the upper end of the valve member 59.

At the lower end of the valve body an intake port 66 is provided in the end plug 54. It will be understood that the intake port 66 is arranged to be connected, for example, to the control port 24' shown in Figure 2. The exhaust to the atmosphere is provided by an exhaust port 67, Figure 5, which extends through the housing 51 and a portion of the liner 52 where it continues on through a port 68 to the valve chamber 56.

In order to vent or bleed the end chamber 33, Figure 2, to the atmosphere it will be recalled that provision is made for connecting it directly to the atmosphere. In the reset or sequence bleed valve 45, shown in Figures 4 and 5, this is accomplished through the provision of a main passageway between the intake port 66 and the exhaust port 67. The first portion 69 of the main passageway extends along the outer portion of the liner 52 and at its lower end it communicates with a transverse passageway 70 in the end plug 54 which intercepts the intake port 66.

A second portion 71, Figure 4, of the main passageway is arranged to communicate with the exhaust port 67 through a port 72 which opens into an annular passageway 73 around the first valve member or spool 58 when it is in the open position as shown in Figure 8, for example. Since the exhaust port 67 and port 68 always are in communication with the annular passageway 73, when the first valve member or spool 58 is operated to the open position, the second portion 71 of the main passageway is connected to the atmosphere. When the first valve member or spool 58 is in the closed position, shown in Figures 4 and 5, a portion 74 of it is interposed between the port 72 and port 68 and is sealed off by the adjacent O rings.

The lower end of the second portion 71 of the main passageway communicates through a port 75 in the liner 52 with an annular passageway 76 around the second valve member or spool 59 when it is in the open position and thence through a port 77 with the first portion 69 of the main passageway. When the second valve member or spool 59 is in the closed position, as shown in Figure 10, its lower portion 78 is interposed between the port 75 and the port 77 which always is in communication with the annular passageway 76 with the result that the communication between the second portion 71 of the main passageway and the first portion 69 thereof is cut off under these conditions.

With a view to applying fluid pressure to the valve chamber 57 and against the second valve member or spool 59 to hold it in the open position shown in Figures 4 and 5 an auxiliary passageway 81 is provided in the outer surface of the liner 52 as shown in Figure 5. At its upper end the auxiliary passageway 81 communicates through a port 82 in the liner 52 with an annular passageway 83 around the first valve member or spool 58 which always is in communication through a port 84 in the liner 52 with the first portion 69 of the main passageway above referred to. At its lower end the auxiliary passageway 81 communicates through a port 85 in the liner 52 with the valve chamber 57. The upper portion 86 of the first valve member or spool 58 in the open position closes off the communication between the auxiliary passageway 81 and the first portion 69 of the main passageway as shown, for example, in Figure 6 of the drawings. This follows since, when the first valve member or spool 58 is depressed, the portion 86 overlies the port 84.

In order to permit the second valve member or spool 59 to move to the closed position, the valve chamber 57 is vented through a vent passageway 87 into the second portion 71 of the main passageway. Usually it is desirable to provide for controlling the rate at which the valve chamber 57 is vented in order to control the movement of the second valve member or spool 59. An important reason for this control is to provide for sufficient air bleed through all the volume between the intake port 66 and the control end of the valve 19 such that the spool 26 of this valve will shift to the alternate position before the spring 63 pushes the second valve member or spool 59 to the closed position where further bleeding of the valve 19 is prevented. For this purpose a timer valve 88 is employed, as illustrated, it being in the form of a needle valve the position of which can be adjusted to control the effective area of the vent passageway 87 as will be understood readily. Valve 88 does not restrict flow between ports 75 and 72.

At the lower ends of the valve chambers 56 and 57 ports 90 and 91 are provided through the housing 51 and liner 52 to place them in direct communication with the atmosphere. The purpose of the ports 90 and 91 is to avoid any likelihood of vacuum binding of the first and second valve members or spools 58 and 59 in their respective chambers.

In describing the reset or sequence bleed valve 45 with reference to Figures 4 and 5 of the drawings, it was assumed that air pressure is applied through the intake port 66 and that the first valve member or spool 58 was in the closed or unoperated position. Since the portion 74 of the first valve member or spool 58 overlies the port 72, the main passageway between the intake port 66 and exhaust port 67 is closed at this point. However, air pressure is applied from the intake port 66 through transverse passageway 70, first portion 69 of the main passageway, port 84, annular passageway 83, port 82, auxiliary passageway 81 and port 85 to the valve chamber 57. There it is effective to hold the second valve member or spool 59 in the open position against the biasing action of the coil compression spring 63. The air pressure also is applied under these conditions through vent passageway 87 to the second portion 71 of the main passageway. Also air pressure is applied to the second portion 71 of the main passageway from the first portion 69 thereof through port 77, annular passageway 76 in the second valve member or spool 59 and port 75. However, since port 72 is closed from exhaust port 67 by the portion 74 of the first valve member or spool 58, the second valve member or spool 59 remains in the open position.

Assuming now that it is desired to operate the reset or sequence bleed valve 45 for effecting the bleeding of the end chamber 33, Figure 2, and movement of the work member or piston 13 to the position there shown, the push button 61 is depressed to move the first valve member or spool 58 inwardly. The first phase of the sequence of operation is illustrated in Figures 6 and 7 of the drawings. It will be observed that the second valve member or spool 59 remains stationary while the port 84 is closed off by the portion 86 of the first valve member or spool 58. As a result the previous direct connection between the intake port 66 and the valve chamber 57 is cut off. However, the trapped air in the valve chamber 57 is effective to hold the second valve member or spool 59 in the open position.

The next phase in the operation is illustrated in Figures 8 and 9 of the drawings where the port 72, previously closed off by the portion 74 of the first valve member or spool 58 now is opened. Air now can be bled from the intake port 66 through transverse passageway 70, first portion 69 of the main passageway, port 77, annular passageway 76 in the second valve or spool member 59, port 75, second portion 71 of the main passageway, port 72, annular passageway 73 in the first valve member or spool 58 which now serves to place the port 72 in direct communication with the exhaust port 67 through the port 68.

In the illustration of the reset or sequence bleed valve 45 shown in Figures 8 and 9, the inward movement of the first valve member or spool 58 has been completed. The end chamber 33 then is vented directly to the atmosphere for effecting the operation illustrated in Figure 2. Now, even though the first valve member or spool 58 remains in the depressed or operated position shown in Figures 8 and 9, the second valve member or spool 59 automatically moves to the closed position. This next phase is illustrated in Figures 10 and 11 of the drawings. It will be recalled that the air pressure applied to the second valve member or spool 59 to hold it in the open position was trapped as a result of the initial movement of the first valve member or spool 58. Since the second portion 71 of the main passageway now is vented directly to the atmosphere in the manner described, the air under pressure in the valve chamber 57 escapes through the vent passageway 87 at a rate which is determined by the setting of the timer valve 88. After the interval elapses for which the valve 88 is set, the pressure within valve chamber 57 is reduced to such an extent that the spring 63 is able to bias the second valve member or spool 59 to the closed position shown in Figures 10 and 11. When this occurs the portion 78 of the second valve member or spool 59 closes off the port 75 and thus opens the connection between the first portion 69 of the main passageway and the second portion 71 thereof. The result is that, even though the first valve member or spool 58 is held in the operated position, as shown in Figures 10 and 11, the bleed through the intake port 66 is stopped by the automatic operation of the second valve member or spool 59 to the closed position. Then it is possible to effect the operation of the motor 11 to the alternate position from that shown in Figure 2 by the operation of the button bleed valve 23 to bleed the end chamber 32 in the manner previously described. As long as the first valve member or spool 58 is held in the open position as shown in Figures 10 and 11, the second valve member or spool 59 will remain in the closed position.

Figures 12 and 13 show the relative positions of the various parts of the reset or sequence bleed valve 45 immediately after the first valve member or spool 58 is returned to the unoperated position. They are essentially the same as Figures 4 and 5 insofar as the relative positions of the parts are concerned but they are shown in order to illustrate the flow of the compressed air resulting from the restoration of the first valve member or spool 58 to the closed position.

It will be recalled that the second valve member or spool 59, as shown in Figures 10 and 11, prevents further bleeding of the associated end chamber of the internal bleed pilot operated valve 19. As soon as the first valve member or spool 58 is restored to the position shown in Figures 12 and 13, air under pressure can flow from the intake port 66 through the transverse passageway 70, and first portion 69 of the main passageway and, as indicated by the arrow 92 through the port 84 in the liner 52 to the annular passageway 83 in the first valve member or spool 58 which now registers with this port. The flow of compressed air can be traced further through the port 82, Figure 13, as indicated by the arrow 93 and through the auxiliary passageway 81 to the port 85. Air pressure then is applied in the valve chamber 57 above the second valve member or spool 59 and the biasing action of the spring 63 is overcome. The second valve member or spool 59 then is operated to the position shown where air can flow, as indicated by the arrow 95 in Figure 12, through the port 77 and annular passageway 76, through the port 75 to the second portion 71 of the main passageway. However, since the first valve member or spool 58 is in the closed position, the port 72 is closed off by the portion 74 and bleeding to the atmosphere through the exhaust port 67 is prevented. Preferably the relationship between the spacings between the O rings 60 and the ports 72 and 84 is such that, when the spool 58 returns to the unoperated position shown in Figures 4 and 5, the port 72 is first closed off by the portion 74. During the latter portion of the closing stroke the port 84 is uncovered and is thereby placed in communication with passageway 83. The reason for this sequence is to prevent bleeding of air through the intake port 66 during the reset stroke of the first valve member or spool 58.

When the reset or sequence bleed valve 45, constructed as shown and described, is used the bleed from the valve 19 and the automatic shut-off of this bleed by the second valve member or spool 59 are independent of the velocity with which the first valve member or spool 58 is operated to the fully actuated position shown in Figures 8–11 of the drawings. This permits operation of the valve 19 wholly independently of variations in operation of the first valve member or spool 58.

In Figure 3 of the drawings the ports 68, 72, 82 and 84 are shown as each comprising three parallel ports. Such multiple ports are employed in those instances where one of the O rings 60 is required to move past the respective port. This construction prolongs the life of the O rings 60 over what it would be if they were required to move past a single port of area equal to that of the multiple ports. It will be understood that the cycle above described for the fluid operated system shown in Figure 2 can be repeated.

Figure 14 shows a typical application of the reset or sequence bleed valve 45 in a fluid operated system. For illustrative purposes the fluid motor 11 is shown and a second fluid motor 11' also is illustrated. Internal bleed pilot operated valves 19 and 19' are provided for controlling the operation of the fluid motors 11 and 11', respectively.

The system is initiated in operation by means of a foot pedal 96 which is arranged to cooperate with a conventional bleed valve 97 that operates through a spring return valve 98 which is shown in the open position in Figure 14. It will be observed that the valve 98 is held in the open position by means of an arm 99 which is carried by and moved with the connecting rod 14' of the fluid motor 11'. In the alternate position of the arm 99 it operates a conventional bleed valve 100 which is connected to a conduit 101 that is commonly connected to the valves 19 and 19' as illustrated. The connecting rod 14 of the fluid motor 11 carries an arm 102 which is arranged to engage the push button 61 of the reset or sequence bleed valve 45 previously described.

Assuming that the system is initially as illustrated in Figure 14 and fluid pressure is applied from a suitable source to the conduits 36 and 36', the operator depresses the foot pedal 96 and opens bleed valve 97 to the atmosphere. The right hand end of the internal bleed pilot operated valve 19 then is bled to the atmosphere in the manner previously described and fluid pressure is applied to the work member or piston 13 to operate it to the left to perform a desired work operation. For example, the connecting rod 14 might be connected to a clamping mechanism which would clamp a member or part in place on which an operation is to be performed subsequently.

At the end of its outward stroke the arm 102 engages the push button 61 and depresses it to operate the reset or sequence bleed valve 45 in a manner previously described. The left hand end of the internal bleed pilot operated valve 19' is then vented to the atmosphere and fluid pressure is applied through the conduit 17' to the left hand side of the work member or piston 13'. The connecting rod 14' then moves outwardly carrying with it the arm 99 to perform some operation, for example, on the part clamped by the fluid motor 11. The valve 98 then automatically closes and prevents further operation by the foot pedal 96 until the arm 99 again opens the valve 98. The connecting rod 14' continues in its forward movement until it operates the bleed valve 100.

It will be recalled that the construction and operation of the reset or sequence bleed valve 45 is such that, shortly after it has been operated to bleed the left hand end of the valve 19', it automatically closes off the bleed. As a result, even though the push button 61 remains depressed as a result of the forward movement of the arm 102 by the fluid motor 11, the valve 19' is ready to be actuated by the operation of the bleed valve 100 as soon as it is actuated by the arm 99. Accordingly, as a result of the actuation of the bleed valve 100, both of the valves 19 and 19' are operated and the fluid motors 11 and 11' are restored to the positions shown in Figure 14. As soon as the arm 102 moves away from the reset or sequence bleed valve 45, it is reset in the manner previously described. The valve 98 is opened when the arm 99 reengages it and the system then is in condition for a repetition of this cycle.

In Figures 15–18 of the drawings there is illustrated, generally, at 103 a reset or sequence bleed valve which is a modification of the valve 45 previously described. The valve 103 can be employed in lieu of the valve 45. Accordingly, only a description of the valve 103 will be set forth since its application in the system, such as the system illustrated in Figure 14, will be essentially the same as described for the valve 45.

The valve 103 includes a valve body 104 provided with end caps 105 and 106 that are secured thereto by bolts 107 and 108. The end cap 106 is provided with an intake port 109 which, it will be understood, is arranged to be connected to the control port 24' of the internal bleed pilot operated valve 19 illustrated in Figure 2. An exhaust port is provided at 110 in the end cap 105 in which a shank 111 is slidably mounted having a slabbed off side 112 which provides the passageway through which the fluid can be bled to the atmosphere. At its outer end the shank 111 carries an externally operable button head 113. The shank 111 is threaded on the upper end of a central stem 114 which forms a part of a first valve member that is illustrated, generally, at 115. The central stem 114 extends axially inwardly of the valve body 104 and slidably mounted thereon underneath the shank 111 is a sleeve 116 which is biased outwardly with respect thereto by means of a coil compression spring 117 which reacts between the sleeve 116 and a flange 118 extending radially from the central stem 114. The sleeve 116 is provided with an O ring 119 in order to provide a seal between its upper end and the underside of the end cap 105 and around the exhaust port 110. A coil compression spring 120 acts to bias the first valve member 115 outwardly to the closed position by reacting against the underside of the flange 118 and the valve body 104. Additional seals are provided by O rings 122 and 123, the former being located around the central stem 114 below the shank 111 and the latter being located around the sleeve 116.

It will be understood that, when the sleeve 116 is depressed, the exhaust port 110 is placed in communication with the main passageway 124. It is desirable to place the main passageway 124 in communication with an auxiliary passageway 125 extending axially of the central stem 114. For this purpose radial ports 126 are provided in the central stem 114 in communication with the auxiliary passageway 125 therein. The radial ports 126 open into radial slots 127 in the sleeve 116 which in turn open into the main passageway 124.

With a view to closing off the bleed through the exhaust port 110 the lower end of the auxiliary passageway 125 is arranged to be closed off by a conical surface 130 of a second valve member 131 which is positioned in longitudinal axial alignment with the first valve member 115. The second valve member 131 is movable in a chamber 132 in the valve body 104 and is carried by a cup 133 that is mounted on the upper end of a stem 134 which is axially slidable in a fitting 135 that is suitably secured to the valve body 104. The cup 133 carrying the second valve member 131 is held, in part, in the open position by a coil compression spring 136 which reacts between the underside of the fitting 135 and a stepped washer 137 which is held in place by a nut 138 that is threaded on the lower end of the stem 134. By adjusting the position of the nut 138 it is possible to vary the force exerted by the coil compression spring 136.

There is an annular space 139 around the cup 133 in order to place the upper portion of the chamber 132 in communication through a port 140 in the fitting 135 with a bore 141 in the lower end of the valve body 104 which is in direct communication with the intake port 109.

When air under pressure is applied through the air intake port 109 with the first valve member 115 in the closed position as shown in Figure 15, the air pressure is applied to the conical surface 130 of the second valve member 131 and also to the under surface 142 of the cup 133 and to the lower end of the stem 134. Under static conditions the same air pressure is applied to the conical surface 130 and to the under surface 142, including the end of the stem 134, with the result that the spring 136 by itself holds the second valve member 131 in the open position. As long as the button head 113 and the first valve member 115 remain in the non operated position, the air pressure is applied to the chamber 132 and to the auxiliary passageway 125 and main passageway 124. The bleed to the atmosphere through the exhaust port 110 is prevented by means of the seal provided by the O ring 119.

Assuming that it is desired to operate the internal bleed pilot operated valve 19, Figure 2, using the valve 103, a force is applied to the button head 113 and it is moved inwardly to the position shown in Figure 16 where the lower end of the shank 111 engages the upper end of the sleeve 116 and compresses the spring 120. This lost motion between the central stem 114 and sleeve 116 of the first valve member 115 permits the shifting of the sleeve 116 so that the main passageway 124 can be vented to the atmosphere. The take up movement of the shank 111 is illustrated in Figure 16 and continued movement thereof to the fully open position is illustrated in Figure 17. Here it will be observed that the main passageway 124 is in communication with the atmosphere through the exhaust port 110 provided by the slabbed off side 112 of the shank 111 and also by a flat portion 143 of the button head 113. The intake port 109 then is in direct communication with the atmosphere through the bore 141, port 140, chamber 132, auxiliary passageway 125, port 126, slot 127, main passageway 124 and exhaust port 110.

When the first valve member 115 occupies the position shown in Figure 17 with both of the springs 117 and 120 compressed, the inner end 144 of the central stem 114 is in close proximity to the conical surface 130 of second valve member 131. As the bleeding of the chamber of the internal bleed pilot operated valve 19 proceeds to the point necessary to effect its operation, the flow of this air through the restricted orifice made by the lower end of the central stem 114 in close proximity with the top of the conical surface 130 causes a lowered static pressure on the top of this conical surface. Meanwhile, the static fluid pressure on the under surface 142 of the cup 133 and on the lower end of the stem 134 is substantially unchanged, with the result that there is a net force on the cup 133 in the upward direction opposing the downward force from the spring 136. When this differential force just exceeds the spring force, the cup 133 moves upwardly, further increasing the orifice effect between the inner end 144 of the stem 114 and the conical surface 130, causing an increased differential pressure upon cup 133. This continues until the vertex of the conical surface 130 is inserted into the auxiliary passageway 125, thereby causing blockage of any further flow of air. At this time, the main passageway 124 and auxiliary passageway 125 above this junction are all at atmospheric pressure, while below it, high line pressure fed from the internal bleed of the pilot operated valve 19 is blocked with the result that a force in the amount of line pressure times the area of the cross section of the auxiliary passageway 125 exists holding the second valve member 131 in closed position against the smaller separating force of spring 136. This closes off the auxiliary passageway 125 and prevents further bleeding to the atmosphere. Even though the button head 113 remains depressed and the first valve member 115 remains in the open position, the bleeding action is stopped. Then it is possible to operate the internal bleed pilot operated valve 19 in the opposite direction in the manner above described.

For the purpose of using the reset valve 45 in a circuit requiring a timed delay between actuation of its plunger 61 and the subsequent motion of the rod 14, such delay may be accomplished by throttling the flow from port 75. This can be done by interposing a throttling valve between ports 75 and 72 in passageway 71, or by valve throttling the same flow out of port 67.

Although the preceding description covers the use of internal bleed pilot operated valves, there are times when it is advantageous to use external bleed pilot operated valves. In the later, the source of fluid pressure serving the end chambers of the pilot valve spool are served by an equally flow-restricted pair of lines deriving fluid pressure from inlet conduit 36 or a completely separate inlet conduit of either lower or higher pressure relative to that in conduit 36. This system is useful in cases in which it is desired to operate a work element by, say, high pressure oil served by conduit 36, and to have the control system operated by lower pressure air.

Since certain further changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. A sequence valve comprising, in combination, a valve body having intake and exhaust ports, first and second valve members movable in said valve body, said first valve member being externally operable to open position and said second valve member being movable in a chamber to open position by application thereto of fluid pressure, and means biasing said second valve member to closed position, said valve body being provided with a main passageway between said intake and exhaust ports having a first portion communicating with said intake port and a second portion arranged to communicate with said exhaust port, a portion of said first valve member in closed position being interposed between said second portion of said main passageway and said exhaust port, said second valve member in closed position being interposed between said first and second portions of said main passageway, said valve body being provided with an auxiliary passageway communicating with said chamber and arranged to communicate with said intake port, another portion of said first valve member in open position being interposed between said auxiliary passageway and said intake port, said valve body being provided with a vent passageway between said chamber and said second part of said main passageway, movement of said first valve member to open position preventing further application of fluid pressure to said chamber through said auxiliary passageway while permitting the discharge thereof through said vent passageway to said exhaust port and placing said intake port in communication with said exhaust port, said second valve member being moved to closed position by its biasing means on predetermined reduction of fluid pressure in said chamber to prevent further communication between said intake and exhaust ports until said first valve member is restored to open position and the aforesaid cycle is repeated.

2. A sequence valve comprising, in combination, a valve body having intake and exhaust ports, first and second valve spools longitudinally axially aligned and movable in said valve body, said first valve spool being externally operable to open position and said second valve spool being movable in a chamber to open position by application thereto of fluid pressure, and means individually biasing said valve spools to closed positions, said valve body being provided with a main passageway between said intake and exhaust ports having a first portion communicating with said intake port and a second portion arranged to communicate with said exhaust port, a portion of said first valve spool in closed position being interposed between said second portion of said main passageway and said exhaust port, said second valve spool in closed position being interposed between said first and second portions of said main passageway, said valve body being provided with an auxaliary passageway communicating with said chamber and arranged to communicate with said intake port, another portion of said first valve spool in open position being interposed between said auxiliary passageway and said intake port, said valve body being provided with a vent passageway between said chamber and said second part of said main passageway, movement of said first valve spool to open position preventing further application of fluid pressure to said chamber through said auxiliary passageway while permitting the discharge thereof through said vent passageway to said exhaust port and placing said intake port in communication with said exhaust port, said second valve spool being moved to closed position by its biasing means on predetermined reduction of fluid pressure in said chamber to prevent further communication between said intake and exhaust ports until said first valve spool is restored to open position and the aforesaid cycle is repeated.

3. A sequence valve comprising, in combination, a valve body having intake and exhaust ports, first and second valve spools movable in said valve body, said first valve spool having first and second annular passageways therearound and being externally operable to open position and said second valve spool having an annular passageway therearound and being movable in a chamber to open position by application thereto of fluid pressure, and means individually biasing said valve spools to closed positions, said valve body being provided with a main passageway between said intake and exhaust ports having a first portion communicating with said intake port and a second portion arranged to communicate with said exhaust port, a portion of said first valve spool in closed position being interposed between said second portion of said main passageway and said exhaust port, said second valve member in closed position being interposed between said first and second portions of said main passageway, said valve body being provided with an auxiliary passageway communicating with said chamber and through said first annular passageway of said first spool with said intake port, another portion of said first valve spool in open position being interposed between said auxiliary passageway and said intake port, said valve body being provided with a vent passageway between said chamber and said second part of said main passageway, movement of said first valve member to open position against its biasing means preventing further application of fluid pressure to said chamber through said auxiliary passageway while permitting the discharge thereof through said vent passageway to said exhaust port and placing said intake port in communication with said exhaust port through said second annular passageway of said first spool, said second valve spool being moved to closed position by its biasing means on predetermined reduction of fluid pressure in said chamber to prevent further communication between said intake and exhaust ports through said annular passageway around said second valve spool until said first valve member is restored to open position and the aforesaid cycle is repeated.

4. A sequence valve comprising, in combination, a valve body having intake and exhaust ports, first and second valve members movable in said valve body, said first valve member being externally operable to open position and said second valve member being movable in a chamber to open position by application thereto of fluid pressure, means biasing said second valve member to closed position, said valve body being provided with a main passageway between said intake and exhaust ports having a first portion communicating with said intake port and a second portion arranged to communicate with said exhaust port, a portion of said first valve member in closed position being interposed between said second portion of said main passageway and said exhaust port, said second valve member in closed position being interposed between said first and second portions of said main passageway, said valve body being provided with an auxiliary passageway communicating with said chamber and arranged to communicate with said intake port, another portion of said first valve member in open position being interposed between said auxiliary passageway and said intake port, said valve body being provided with a vent passageway between said chamber and said second part of said main passageway, and a timer valve for controlling the flow of fluid from said chamber, movement of said first valve member to open position preventing further application of fluid pressure to said chamber through said auxiliary passageway while permitting the discharge thereof through said vent passageway to said exhaust port and placing said intake port in communication with said exhaust port, said second valve member being moved to closed position by its biasing means on predetermined reduction of fluid pressure in said chamber to prevent further communication between said intake and exhaust ports until said first valve member is restored to open position and the aforesaid cycle is repeated.

5. A sequence valve comprising, in combination, a valve body having intake and exhaust ports, first and second valve members movable in said valve body, said first valve member being externally operable to open position and said second valve member being movable in a chamber communicating with said intake port to open position by application of fluid pressure, and means biasing said second valve member to open position, said valve body being provided with a main passageway arranged to communicate with said exhaust port, said first valve member being provided with an auxiliary passageway communicating with said chamber and said main passageway and arranged to be closed off by said second valve member; movement of said first valve member to open position placing said discharge port in communication with said intake port through said main passageway, auxiliary passageway, and said chamber and placing one end of said auxiliary passageway in close proximity to said second valve member; the flow of fluid from said chamber around said second valve member into said auxiliary passageway causing a reduction in the fluid pressure applied to the side adjacent said first valve member whereby the fluid pressure applied to the other side of said second valve member overcomes the biasing action of said biasing means and said second valve member closes off said auxiliary passageway to prevent further communication between said intake and exhaust ports until said first valve member is restored to open position and the foregoing cycle is repeated.

6. A sequence valve comprising, in combination, a valve body having intake and exhaust ports, first and second valve members longitudinally axially aligned and movable in said valve body, said first valve member being externally operable to open position and said second valve member being movable in a chamber communicating with said intake part to open position by application of fluid pressure, and spring means reacting between said valve body and said second valve member and biasing the same to open position, said valve body being provided with a main passageway arranged to communicate with said exhaust port, said first valve member being provided with an auxiliary passageway communicating with said chamber and said main passageway and arranged to be closed off by said second valve member; movement of said first valve member to open position placing said discharge port in communication with said intake port through said main passageway, auxiliary passageway, and said chamber and placing one end of said auxiliary passageway to close proximity to said second valve member; the flow of fluid from said chamber around said second valve member into said auxiliary passageway causing a reduction in the fluid pressure applied to the side adjacent said first valve member whereby the fluid pressure applied to the other side of said second valve member overcomes the biasing action of said spring means and said second valve member closes off said auxiliary passageway to prevent further communication between said intake and exhaust ports until said first valve member is restored to open position and the foregoing cycle is repeated.

7. A sequence valve comprising, in combination, a valve body having intake and exhaust ports, first and second valve members movable in said valve body, said first valve member being externally operable to open position and including a central stem provided with a longitudinally extending auxiliary passageway having radial ports at its inner end and having a surrounding relatively slidable sleeve provided with radial slots communicating with said radial ports, said second valve member being movable in a chamber communicating with said intake port to open position by application of fluid pressure and arranged to close off the outer end of said auxiliary passageway, means biasing said second valve member to open position, said valve body being provided with a main passageway arranged to communicate with said exhaust port and communicating with said radial slots, sealing means between the outer end of said sleeve and said valve body, spring means reacting between said central stem and said sleeve to hold said sealing means in sealing position when said stem is in closed position, spring means reacting between said valve body and said stem and biasing the same to closed position; the initial movement of said stem toward open position being relative to said sleeve until the latter is engaged by the former whereupon said discharge port is placed in communication with said intake port through said main passageway, radial slots and ports, auxiliary passageway, and said chamber and said outer end of said auxiliary passageway is placed in close proximity to said outer end of said second valve member; the flow of fluid from said chamber around said second valve member into said auxiliary passageway causing a reduction in the fluid pressure applied to the side adjacent said first valve valve member whereby the fluid pressure applied to the other side of said second valve member overcomes the biasing action of said biasing means and said second valve member closes off said auxiliary passageway to prevent further communication between said intake and exhaust ports until said first valve member is restored to open position and the foregoing cycle is repeated.

8. A fluid operated system comprising, in combination, a fluid motor having a work member movable in a work chamber in one direction or the other on application of fluid pressure to one side or the other of said work member and accompanied by exhaustion of fluid pressure from the opposite side, and internal bleed pilot operated valve connected to said fluid motor for controlling the flow of fluid thereto and exhaustion of fluid therefrom to operate said work member from one position to another and vice versa, and sequence valve means connected to said internal bleed pilot operated valve for effecting the operation thereof from one position to another to effect a corresponding operation of said work member, said sequence valve means including means for automatically shutting itself off when said internal bleed pilot operated valve has been operated to said other position while said sequence valve itself remains in its operated position whereby said internal bleed pilot operated valve can be operated back to said one position.

9. A fluid operated system comprising, in combination, a fluid motor having a work member movable in a work chamber in one direction or the other on application of fluid pressure to one side or the other of said work member and accompanied by exhaustion of fluid pressure from the opposite side, an internal bleed pilot operated valve connected to said fluid motor for controlling the flow of fluid thereto and exhaustion of fluid therefrom to operate said work member from one position to another and vice versa, and sequence valve means connected to said internal bleed pilot operated valve for effecting the operation thereof from one position to another to effect a corresponding operation of said work member, said sequence valve means including a first valve member and a second valve member automatically operable when said internal bleed pilot operated valve has been operated to said other position to shut off further bleeding from said internal bleed pilot operated valve while said first valve member remains in the operated position whereby said internal bleed pilot operated valve can be operated back to said one position.

10. A fluid operated system comprising, in combination, a fluid motor having a work member movable in a work chamber in one direction or the other on application of fluid pressure to one side or the other of said work member and accompanied by exhaustion of fluid pressure from the opposite side, an internal bleed pilot operated valve connected to said fluid motor for controlling the flow of fluid thereto and exhaustion of fluid therefrom to operate said work member from one position to another and vice versa, and sequence valve means connected to said internal bleed pilot operated valve for effecting the operation thereof from one position to another to effect a corresponding operation of said work member, said sequence valve means including a valve body having an intake port connected to bleed said internal bleed pilot operated valve and an exhaust port, first and second valve members movable in said valve body, said first valve member being externally operable to open position and said second valve member being movable in a chamber to open position by application thereto of fluid pressure and means biasing said second valve member to closed position, said valve body being provided with a main passageway between said intake and exhaust ports having a first portion communicating with said intake port and a second portion arranged to communicate with said exhaust port, a portion of said first valve member in closed position being interposed between said second portion of said main passageway and said exhaust port, said second valve member in closed position being interposed between said first and second portions of said main passageway, said valve body being provided with an auxiliary passageway communicating with said chamber and arranged to communicate with said intake port, another portion of said first valve member in open position being interposed between said auxiliary passageway and said intake port, said valve body being provided with a vent passageway between said chamber and said second part of said main passageway, movement of said first valve member to open position preventing further application of fluid pressure to said chamber through said auxiliary passageway while permitting the discharge thereof through said vent passageway to said exhaust port and placing said intake port in communication with said exhaust port to bleed said internal bleed pilot operated valve, said second valve member being moved to closed position by its biasing means on predetermined reduction of fluid pressure in said chamber to prevent further communication between said intake and exhaust ports whereby said internal bleed pilot operated valve can be operated back to said one position.

11. A fluid operated system comprising, in combination, a fluid motor having a work member movable in a work chamber in one direction or the other on application of fluid pressure to one side or the other of said work member and accompanied by exhaustion of fluid pressure from the opposite side, an internal bleed pilot operated valve connected to said fluid motor for controlling the flow of fluid thereto and exhaustion of fluid therefrom to operate said work member from one position to another and vice versa, and sequence valve means connected to said internal bleed pilot operated valve for effecting the operation thereof from one position to another to effect a corresponding operation of said work member, said sequence valve means including a valve body having an intake port connected to bleed said internal bleed pilot operated valve and an exhaust port, first and second valve members movable in said valve body, said first valve member being externally operable to open position and said second valve member being movable in a chamber communicating with said intake port to open position by application of fluid pressure, and means biasing said second valve member to open position, said valve body being provided with a main passageway arranged to communicate with said exhaust port, said first valve member being provided with an auxiliary passageway communicating with said chamber and said main passageway and arranged to be closed off by said second valve member; movement of said first valve member to open position placing said discharge port in communication with said intake port through said main passageway, auxiliary passageway, and said chamber to bleed said internal bleed pilot operated valve and placing one end of said auxiliary passageway in close proximity to said second valve member; the flow of fluid from said chamber around said second valve member into said auxiliary passageway causing a reduction in the fluid pressure applied to the side adjacent said first valve member whereby the fluid pressure applied to the other side of said second valve member overcomes the biasing action of said spring and said second valve member closes off said auxiliary passageway to prevent further communication between said intake and exhaust ports whereby said internal bleed pilot operated valve can be operated back to said one position.

12. A fluid operated system comprising, in combination, a fluid motor having a work member movable in a work chamber in one direction or the other on application of fluid pressure to one side or the other of said member and accompanied by exhaustion of fluid pressure from the opposite side; a control valve including a valve body having a valve chamber provided with work ports connected respectively to the opposite sides of said work member, an intake port from a supply of fluid pressure, a pair of exhaust ports, and a control port at each end; a valve spool slidable in said valve chamber and having control passageways therein arranged to selectively place said work ports in communication with said intake port and with said exhaust ports depending upon the position of said valve spool, said valve spool having bleed passageways therein maintaining communication between said intake port and the ends of said valve chamber to apply fluid pressure to one end or the other of said valve spool for operating the same from one end of said valve chamber to the other, and a bleed valve mechanism connected to each of said control ports at least one of which comprises sequence valve means for bleeding the corresponding end of said valve chamber to effect the operation of said work member from one position to the other and subsequently condition said valve spool of said control valve for operation to another position where it can effect reverse movement of said work member, said sequence valve means including means for automatically shutting itself off when said valve spool has been operated to said corresponding end of said valve chamber while said sequence valve means remains in its operated position whereby said valve spool can be operated to the opposite end of said valve chamber.

13. A fluid operated system comprising, in combination, a fluid motor having a work member movable in a work chamber in one direction or the other on application of fluid pressure to one side or the other of said member and accompanied by exhaustion of fluid pressure from the opposite side; a control valve including a valve bidy having a valve chamber provided with work ports connected respectively to the opposite sides of said work member, an intake port from a supply of fluid pressure, a pair of exhaust ports, and a control port at each end; a valve spool slidable in said valve chamber and having control passageways therein arranged to selectively place said work ports in communication with said intake port and with said exhaust ports depending upon the position of said valve spool, said valve spool having bleed passageways therein maintaining communication between said intake port and the ends of said valve chamber to apply fluid pressure to one end or the other of said valve spool for operating the same from one end of said valve chamber to the other, and a bleed valve mechanism connected to each of said control ports at least one of which comprises sequence valve means including a first valve member operable to open position to bleed the corresponding end of said valve chamber and a second valve member automatically operable when said valve spool has been moved to said corresponding end of said valve chamber to shut off further bleeding therefrom while said first valve member remains in its open position whereby said valve spool can be operated to the opposite end of said valve chamber by bleeding the same.

14. A fluid operated system comprising, in combination, a fluid motor having a work member movable in a work chamber in one direction or the other on application of fluid pressure to one side or the other of said member and accompanied by exhaustion of fluid pressure from the opposite side; a control valve including a valve body having a valve chamber provided with work ports connected respectively to the opposite sides of said work member, an intake port from a supply of fluid pressure, a pair of exhaust ports, and a control port at each end; a valve spool slidable in said valve chamber and having control passageways therein arranged to selectively place said work ports in communication with said intake port and with said exhaust ports depending upon the position of said valve spool, said valve spool having bleed passageways therein maintaining communication between said intake port and the ends of said valve chamber to apply fluid pressure to one end or the other of said valve spool for operating the same from one end of said valve chamber to the other, and a bleed valve mechanism connected to each of said control ports at least one of which comprises sequence valve means including a valve body having an intake port connected to the corresponding control port and an exhaust port, first and second valve members movable in said valve body, said first valve member being externally operable to open position and said second valve member being movable in a chamber to open position by application of fluid pressure and means biasing said second valve member to closed position, said valve body being provided with a main passageway between the last mentioned intake and exhaust ports having a first portion communicating with the last mentioned intake port and a second portion arranged to communicate with the last mentioned exhaust port, a portion of said first valve member in closed position being interposed between said second portion of said main passageway and the last mentioned exhaust port, said second valve member in closed position being interposed between said first and second portions of said main passageway, said valve body being provided with an auxiliary passageway communicating with said chamber and arranged to communicate with the last mentioned intake port, another portion of said first valve member in open position being interposed between said auxiliary passageway and the last mentioned intake port, said valve body being provided with a vent passageway between said chamber and said second part of said main passageway, movement of said first valve member to open position preventing further application of fluid pressure to said chamber through said auxiliary passageway while permitting the discharge thereof through said vent passageway to the last mentioned exhaust port and placing the last mentioned intake port in communication with the last mentioned exhaust port to bleed the corresponding end of said valve chamber, said second valve member being moved to closed position by its biasing means on predetermined reduction of fluid pressure in said chamber to prevent further communication between the last mentioned intake and exhaust ports when said valve spool has been moved to said corresponding end of said valve chamber to shut off further bleeding therefrom while said first valve member remains in its open position whereby said valve spool can be operated to the opposite end of said valve chamber by bleeding the same.

15. A fluid operated system comprising, in combination, a fluid motor having a work member movable in a work chamber in one direction or the other on application of fluid pressure to one side or the other of said member and accompanied by exhaustion of fluid pressure from the opposite side; a control valve including a valve body having a valve chamber provided with work ports connected respectively to the opposite sides of said work member, an intake port from a supply of fluid pressure, a pair of exhaust ports, and a control port at each end; a valve spool slidable in said valve chamber and having control passageways therein arranged to selectively place said work ports in communication with said intake port and with said exhaust ports depending upon the position of said valve spool, said valve spool having bleed passageways therein maintaining communication between said intake port and the ends of said valve chamber to apply fluid pressure to one end or the other of said valve spool for operating the same from one end of said valve chamber to the other, and a bleed valve mechanism connected to each of said control ports at least one of which comprises sequence valve means including a valve body having an intake port connected to the corresponding control port and an exhaust port, first and second valve members movable in said valve body, said first valve member being externally operable to open position and said second valve member being movable in a chamber communicating with the second mentioned intake port to open position by application of fluid pressure, and means biasing said second valve member to open position, said valve body being provided with a main passageway arranged to communicate with the second mentioned exhaust port, said first valve member being provided with an auxiliary passageway communicating with said chamber and said main passageway and arranged to be closed off by said second valve member, movement of said first valve member to open position placing the second mentioned discharge port in communication with the second mentioned intake port through said main passageway, auxiliary passageway and said chamber to bleed the corresponding end of said valve chamber and placing one end of said auxiliary passageway in close proximity to said second valve member, the flow of fluid from said chamber around said second valve member into said auxiliary passageway causing a reduction in the fluid pressure applied to the side adjacent said first valve member whereby the fluid pressure applied to the other side of said second valve member overcomes the biasing action of said spring and said second valve member closes off said auxiliary passageway to prevent further communication between the last mentioned intake and exhaust ports when said valve spool has been moved to said corresponding end of said valve chamber to shut off further bleeding therefrom while said first valve member remains in its open position whereby said valve spool can be operated to the opposite end of said valve chamber by bleeding the same.

References Cited in the file of this patent

UNITED STATES PATENTS

| | | |
|---|---|---|
| 599,158 | Andriveau | Feb. 15, 1898 |
| 713,788 | Nethery | Nov. 18, 1902 |
| 2,176,008 | Hoyt | Oct. 10, 1939 |
| 2,268,733 | Williams | Jan. 6, 1942 |
| 2,573,993 | Sedgwick | Nov. 6, 1951 |
| 2,607,197 | Johnson | Aug. 19, 1952 |

FOREIGN PATENTS

| | | |
|---|---|---|
| 1,059 | Great Britain | 1896 |
| 146,983 | Sweden | Sept. 14, 1954 |

UNITED STATES PATENT OFFICE
CERTIFICATE OF CORRECTION

Patent No. 2,846,981                                  August 12, 1958

Stanley F. Kambic

It is hereby certified that error appears in the printed specification of the above numbered patent requiring correction and that the said Letters Patent should read as corrected below.

Column 11, line 63, for "auxaliary" read -- auxiliary --; column 12, line 53, for "to fluid pressure," read -- of fluid pressure, --; column 13, line 44, for "part" read -- port --; line 57, for "to close proximity" read -- in close proximity --; column 14, line 26, strike out "valve", second occurrence; line 66, after "member" insert -- operable to bleed said internal bleed pilot operated valve --; column 16, line 56, for "bidy" read -- body --.

Signed and sealed this 21st day of October 1958.

(SEAL)

Attest:

KARL H. AXLINE                                                     ROBERT C. WATSON

Attesting Officer                                                Commissioner of Patents